May 23, 1933.  W. C. HEDGCOCK  1,910,991
TRUCK
Filed July 21, 1931    2 Sheets-Sheet 1
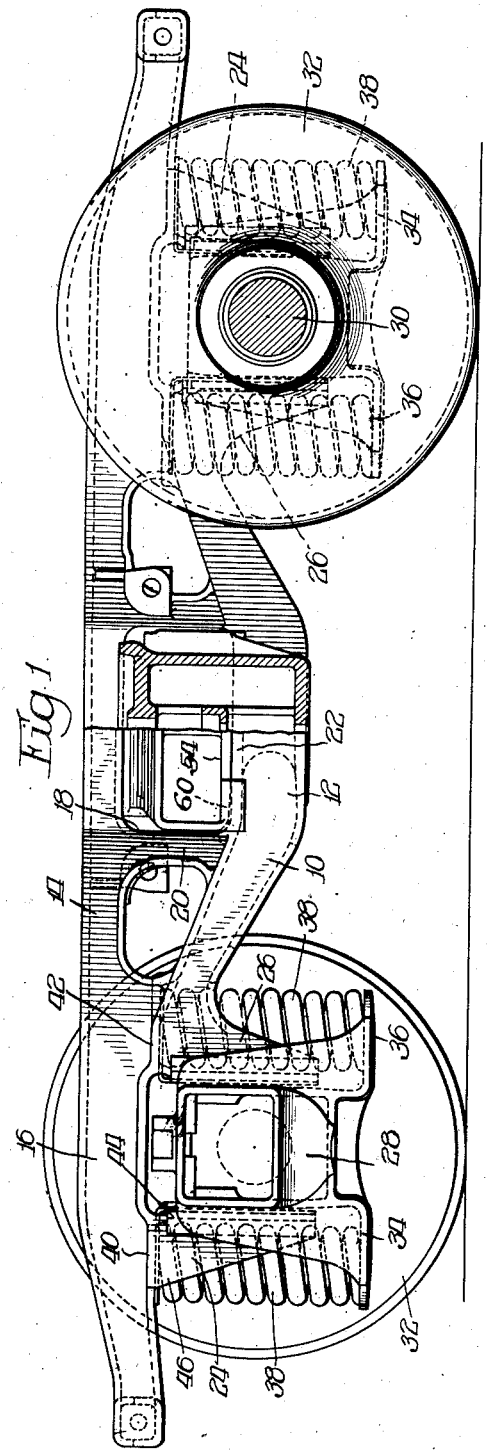
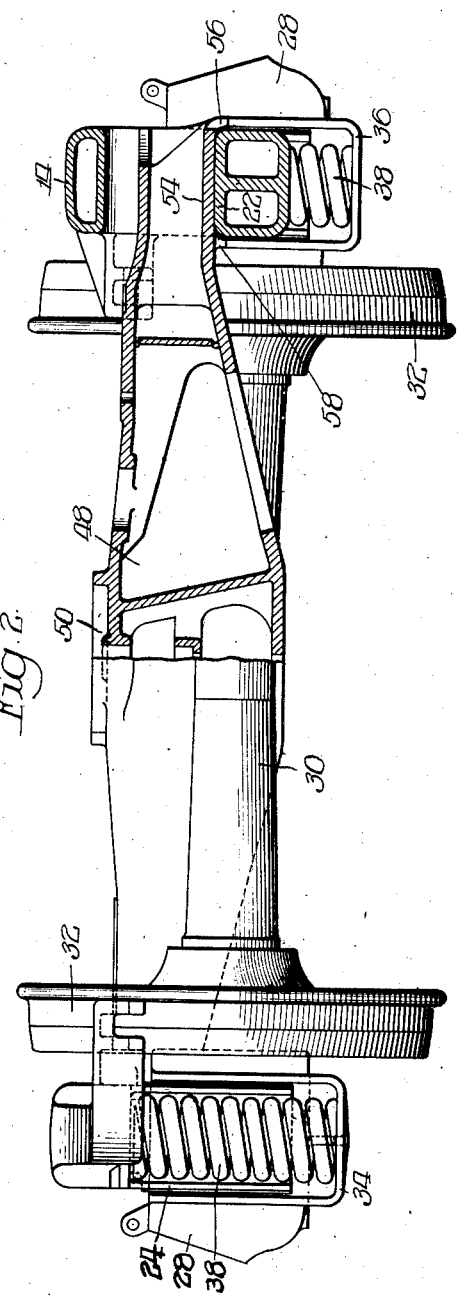
Inventor
William C Hedgcock,
By Wilkinson, Huxley, Byron & Knight
Attys May 23, 1933. W. C. HEDGCOCK 1,910,991
TRUCK
Filed July 21, 1931 2 Sheets-Sheet 2
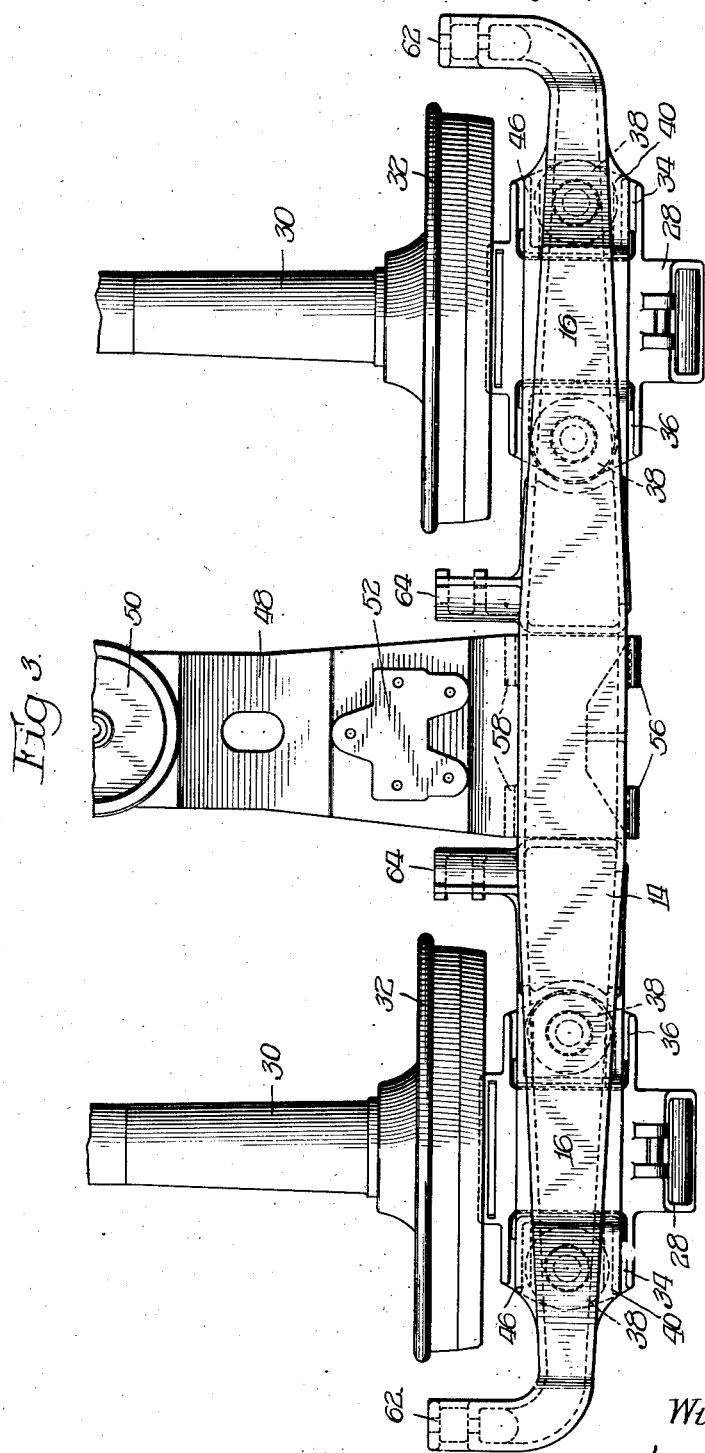
Inventor
William C. Hedgcock Patented May 23, 1933

1,910,991

UNITED STATES PATENT OFFICE

WILLIAM C. HEDGCOCK, OF WILMETTE, ILLINOIS, ASSIGNOR TO AMERICAN STEEL FOUNDRIES, OF CHICAGO, ILLINOIS, A CORPORATION OF NEW JERSEY

TRUCK

Application filed July 21, 1931. Serial No. 552,154.

This invention pertains to a railway car truck.

A certain type of truck is provided with side frames of the pedestal type in which the journal boxes are guided between pedestal jaws, there being springs carried on the top of each journal box for supporting the truck side frame, said springs being positioned between associated pedestal jaws and within a recess in the side frame. Such a method of positioning and enclosing a spring is undesirably restrictive upon the size, proportions, and capacities of the springs so placed, so that in many cases it is impractical to obtain the desirable spring capacity and deflection in high capacity car trucks within the usual clearance conditions.

An object of this invention, therefore, is to provide a car truck construction wherein increased spring capacity is provided, in combination with the pedestal type of side frame.

Another object of the invention is to provide a construction wherein there is direct connection between the side frames and bolster, but wherein the engaging surfaces are arranged for true rocking action to permit a more constant load application.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a side elevation partly in section of a truck embodying the invention;

Figure 2 is an end elevation partly in section of the truck construction shown in Figure 1;

Figure 3 is a one-half top plan of the truck construction shown in Figure 1.

In the type of truck construction illustrated the side frames 10 are preferably of truss construction, having spaced tension and compression members 12 and 14 converging and being integrally formed adjacent each end 16, there being provided a central bolster opening 18 defined by the spaced columns 20 connecting the tension and compression members, the opening formed being provided with a bolster seat 22, said seat being integrally formed on the upper face of the tension member between said columns. The end portions 16 are provided with spaced pedestals 24 and 26 for guiding an associated journal box 28 therebetween. Each journal box 28 is adapted to cooperate with the journal end 30 of the wheel and axle assembly 32 which may be of any construction, such as the standard A. R. A. or the Simplex type, the journal box conforming to any desired construction.

Each journal box is provided with spring seats 34—36 extending laterally from each side thereof upon which are mounted the spring nests 38, said springs carrying the side frame 10 upon seats 40 and 42 disposed on said side frame, the springs being partly embraced by the pedestal jaw structure, including the face 44 and the flanges 46. The springs may be of any desired construction, such as described in application Serial No. 552,153, filed July 21, 1931. It will thus be seen that by placing the springs on seats on each side of the journal box, space is provided for two springs of substantially the same diameter and capacity as can be obtained in a single spring over the top of the box. Furthermore, adequate space is provided for springs of relatively greater height and deflection.

The bolster 48 has the usual center plate 50 and side bearing seats 52 and is directly and flexibly seated as at 54 on each side frame seat 22, the bolster being provided with spaced depending flanges 56 and 58 embracing the seat 22 to position the bolster on the side frame. The seat 54 of the bolster is formed with an arcuate surface as at 60 extending longitudinally of the side frame so that the bolster may rock easily on the side frame seat 22 to permit the side frame to readily oscillate to conform to track irregularities and without causing an eccentric loading on one side of the engaging surface. Although the arcuate surface 60 is shown as provided on the bolster, it will of course be understood that the curve may be reversed and placed on the seat 22. Brake hanger brackets 62 and 64 may be provided on each side of the wheels for suitable brake rigging.

With a truck of the construction shown eccentric loading of the parts is prevented, and easy riding qualities are provided, and it is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a car truck, the combination of tension and compression members and integral connecting column guides forming a bolster opening therewith, the portion of said tension member between said column guides being a bolster seat a bolster rockably supported on said seat, said tension member having an upper and lower chord and merging with said compression member, the merged portion having spaced pedestals for slidably receiving a journal box, said journal box having spring seats below the cellar thereof, the merged portion having spring seats aligned with said first named spring seats and adjacent the upper chord of said tension member, and resilient means between said aligned seats.

2. In a car truck, the combination of tension and compression members and integral connecting column guides forming a bolster opening therewith, the portion of said tension member between said column guides being a bolster seat, a bolster non-resiliently supported on said seat, said tension member having an upper and lower chord and merging with said compression member, the merged portions having spaced pedestals for slidably receiving a journal box, said journal box having spring seats below the cellar thereof, the merged portion having spring seats aligned with said first named spring seats and adjacent the upper chord of said tension member, and resilient means between said aligned seats.

3. In a car truck, the combination of tension and compression members and integral connecting column guides forming a bolster opening therewith, the portion of said tension member between said column guides being a bolster seat, a bolster supported on said seat, said tension member having an upper and lower chord and merging with said compression member, the merged portion having spaced pedestals for slidably receiving a journal box, said journal box having spring seats below the cellar thereof, the merged portion having spring seats aligned with said first named spring seats and adjacent the upper chord of said tension member, and resilient means between said aligned seats.

4. In a car truck, the combination of tension and compression members and integral connecting column guides forming a bolster opening therewith, the portion of said tension member between said column guides being a bolster seat, a bolster supported on said seat, said tension member having an upper and lower chord and merging with said compression member, the merged portion being provided with a spring seat formed substantially as a continuation of said upper chord.

5. In a car truck, the combination of tension and compression members and integral connecting column guides forming a bolster opening therewith, the portion of said tension member between said column guides being a bolster seat, a bolster supported on said seat, said tension member having an upper and lower chord and merging with said compression member, the merged portion being provided with a spring seat formed substantially as a continuation of said upper chord, the lower chord being interrupted in way of said seat for permitting access of a spring thereto.

6. In a car truck, the combination of tension and compression members and integral connecting column guides forming a bolster opening therewith, the portion of said tension member between said column guides being a bolster seat, a bolster rockably supported on said seat, said tension member having an upper and lower chord and merging with said compression member, the merged portion being provided with a spring seat formed substantially as a continuation of said upper chord.

7. In a car truck, the combination of tension and compression members and integral connecting column guides forming a bolster opening therewith, the portion of said tension member between said column guides being a bolster seat, a bolster rockably supported on said seat, said tension member having an upper and lower chord and merging with said compression member, the merged portion being provided with a spring seat formed substantially as a continuation of said upper chord, the lower chord being interrupted in way of said seat for permitting access of a spring thereto.

Signed at Chicago, Illinois, this 19th day of June, 1931.

WILLIAM C. HEDGCOCK.